(12) United States Patent
Mäckel et al.

(10) Patent No.: US 6,239,515 B1
(45) Date of Patent: May 29, 2001

(54) CIRCUIT FOR THE PROTECTION OF ELECTRICAL DEVICES

(75) Inventors: Rainer Mäckel, Königswinter; Peter Hille, Darmstadt; Alf Blessing, Heimingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/423,870

(22) PCT Filed: May 2, 1998

(86) PCT No.: PCT/EP98/02606

§ 371 Date: Mar. 13, 2000

§ 102(e) Date: Mar. 13, 2000

(87) PCT Pub. No.: WO98/52268

PCT Pub. Date: Nov. 19, 1998

(30) Foreign Application Priority Data

May 13, 1997 (DE) ............................................. 197 19 919

(51) Int. Cl.[7] .................................................. H02H 11/00
(52) U.S. Cl. .......................... 307/127; 307/10.7; 361/84; 180/279
(58) Field of Search .................. 307/10.1, 10.7, 307/127; 320/165; 361/18, 56, 58, 82, 84, 103, 106, 245, 246; 180/271, 279, 282, 283, 284

(56) References Cited

U.S. PATENT DOCUMENTS

| 4,471,400 | * | 9/1984 | Reza ........................................ 361/77 |
| 4,520,419 | * | 5/1985 | Locher et al. ........................ 361/104 |
| 5,410,441 | * | 4/1995 | Allman .................................. 361/18 |
| 5,517,379 | * | 5/1996 | Williams et al. ..................... 361/84 |
| 5,539,610 | * | 7/1996 | Williams et al. ..................... 361/246 |
| 5,781,390 | * | 7/1998 | Notaro et al. ........................ 361/84 |

FOREIGN PATENT DOCUMENTS

| 29 19 022 | 11/1980 | (DE) . |
| 39 30 896 | 3/1991 | (DE) . |
| 195 25 112 | 1/1996 | (DE) . |
| 195 01 985 | 7/1996 | (DE) . |
| 1 116 941 | 6/1968 | (GB) . |
| WO 94/23970 | * 10/1994 | (WO) . |

* cited by examiner

Primary Examiner—Fritz Fleming
(74) Attorney, Agent, or Firm—Venable; Norman N. Kunitz

(57) ABSTRACT

The invention relates to a circuit for protecting consumers from damage caused by polarity reversal in an electrical system, comprising a limiter and a tripping device, wherein the system voltage supply is limited when polarity is reversed and the voltage source connected with reversed polarity can be disconnected.

11 Claims, 2 Drawing Sheets

CIRCUIT FOR THE PROTECTION OF ELECTRICAL DEVICES

BACKGROUND OF THE INVENTION

The invention relates to a circuit for the protection of consumers against damages caused by polarity reversal in a vehicle electrical system, which circuit comprises a limiter and a tripping device.

The use of specific components in motor vehicle electrical systems, particularly electrolytic capacitors or semiconductor power switches on MOSFET basis, is limited by the danger of polarity reversal. With an electrolytic capacitor, a polarity reversal can lead to the explosive destruction of the capacitor with the corresponding sequential damages. With semiconductor switches, on the other hand, a polarity reversal can lead to a high current flow over the backward diode for the standard MOS transistors, which can lead to the destruction of the switches and/or to an undesirable activation of consumers. Particularly critical are bridge circuits.

Electrolytic capacitors as well as semiconductor elements are increasingly used in motor vehicle electrical systems. Semiconductor switches are required in particular for electric motors controlled with pulse-width modulation because of the high switching frequencies. Electrolytic capacitors are used to avoid reactive effects on the vehicle electrical system.

The known option of mechanically protecting batteries in an electrical system against polarity reversal cannot be realized in motor vehicles since commercially available batteries are not suitable for this. It is not possible to protect against polarity reversal during a jump-start. Furthermore known is the practice of using seriesconnected diodes to protect individual components or individual modules against damages caused by polarity reversal. The disadvantage in that case is that with higher currents, the dissipation loss of the protective diodes increases sharply. Additional measures with lower dissipation loss involve connecting the elements to be protected in series with inversely switched MOSFETs, e.g., as known from German Patent 39 30 896. However, this solution is very expensive.

German Unexamined Published Patent Application 29 19 022 discloses using a centrally switched relay to prevent polarity reversal. However, the relay needs a relatively high tripping capacity in the switched-on state and also has a relatively high on-resistance, so that in case of a start, a worsening of the system characteristics must be expected. In addition, the shutdown of the relay in the presence of high currents involves the danger of the switching contact being welded together.

A circuit for protecting consumers against polarity reversal damages in a vehicle electrical system is furthermore known from patent GB-A-1 116 941, wherein a limiter is connected parallel to the vehicle electrical system and limits the electrical system voltage to a predetermined value in case of an incorrect polarization. The limiter is formed by a diode with a non-linear current/voltage characteristic. A separator cuts the connection to the vehicle electrical system as soon as the predetermined current value is exceeded. A standard meltdown fuse is provided as the separator. The option of actively disconnecting the vehicle electrical system, which additionally should be reversible, does not exist in this case.

A circuit is disclosed in German Patent A-195 25 112, which is designed to protect consumers against damages caused by polarity reversal in a vehicle electrical system. A limiter is connected parallel to the vehicle electrical system. In the case of polarity reversal, the limiter limits the electrical system voltage. The limiter is formed by two series-connected diodes, known per se, which have a non-linear current/voltage characteristic. An additional control circuit indirectly switches a separator that disconnects the vehicle electrical system from the consumer as soon as a predetermined current value is exceeded.

All circuits currently known from prior the art make it possible in different ways to protect the consumer against polarity reversal. All known circuits are limited to this application and have the disadvantage that they cannot be combined with additional safety devices. Additional safety devices that may be used in vehicle electrical systems must respectively be provided with complete control circuits and separators.

Thus, it is the object of the invention to provide a circuit for protecting consumers against damages from polarity reversal in a vehicle electrical system, which circuit not only can protect the consumers against damages caused by polarity reversal, but can also be combined with other protective devices and can be used as a universal protective device for various malfunction cases.

SUMMARY OF THE INVENTION

The above object is solved according to the present invention by a circuit for the protection of consumers in a vehicle electrical system with a device for protecting against a polarity reversal that comprises: a limiter with a non-linear current/voltage characteristic that is connected parallel to the vehicle electrical system and limits the voltage of the vehicle electrical system to a predetermined value in case of an incorrect polarizaration; a tripping device that activates at least indirectly a separator that cuts the connection to the vehicle electrical system supply if a tripping signal is generated in the tripping device; and wherein the tripping device has an additional connection that allows feeding different tripping signals from other safety devices into the tripping device for separating the vehicle electrical system from the electrical system supply. Modified and advantageous embodiments follow from the description.

According to the invention, a limiter is connected parallel to the vehicle electrical system, which limits the voltage to a non-critical value in the event of polarity reversal. Particularly favorable is a diode with a strongly non-linear characteristic line, wherein the diode becomes low-impedance at a low voltage value, particularly a switching-on voltage value, and can carry high currents while in a state of low-impedance.

It is advantageous if the electrical connection to the electrical supply is severed, at least indirectly, in case of a polarity reversal. It makes sense if a switching separator, particularly a thermally activated bursting switch is used, which is tripped as soon as the limiter makes it possible to detect a polarity reversal. The advantage is that with different polarity reversal cases, consumers as well as battery are protected against damage caused by polarity reversal.

It is particularly favorable if the high currents flowing through the limiter in case of polarity reversal and/or the voltage drop are used to activate a tripping device. An undesirable tripping of the separator with short-term, incorrectly polarized voltage pulses is not possible.

The features essential to the invention are explained further in the following and are described in detail with the aid of Figures. Shown are in:

DETAILED DESCRIPTION OF THE PREFERRED EMBODIMENTS

Figure 1:
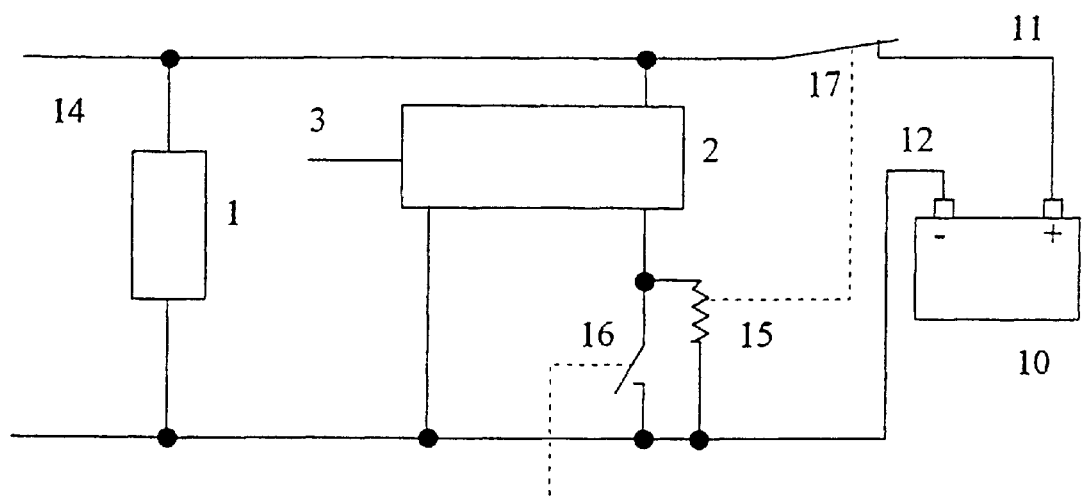
FIG. 1. is a basic wiring diagram of the circuit according to the invention, comprising a limiter, a trip and a separator.

FIG. 1 contains a basic wiring diagram of the circuit according to the invention, comprising a limiter, a tripping device and a separator, shown with the example of a motor vehicle electrical system. The limiter 1 is positioned between the two connections of the vehicle electrical system 14. The vehicle electrical system 14 is supplied by the system supply 10, in particular a battery. A generator can additionally be provided, which is not shown here. The vehicle electrical system 14 is located between the positive pole terminal 11 and the negative pole terminal 12 of the electrical supply system 10. The tripping device 2 monitors the polarity of the voltage that is present or the limiter 1, and can preferably detect a high current flow and/or a voltage drop at the limiter 1. The separator can be a switch 17, particularly a bursting switch, which can be activated thermally with a heating element 15 or with suitable switch and/or relay combinations, to disconnect the electrical system supply 10 from the electrical system 14 in case of an incorrectly polarized connection of the electrical system supply 10, especially a battery, or in case of an incorrectly polarized external supply of the electrical system voltage, particularly during a jump-start of a motor.

It is preferable if the polarity of the electrical voltage is measured between the pole terminals 11 and 12. For the polarity reversal case where a negative voltage is present at the positive pole terminal 11, relative to the pole terminal 12 that is connected to a motor vehicle, a signal is produced that causes the tripping device 2 to disconnect the battery 10 from the electrical system 14. The activation of switch 17 of the separator can be made to depend advantageously on one or several conditions, so that a separation of the electrical supply 10 from the electrical system 14 of a vehicle, for example, occurs only if the internal combustion engine of the motor vehicle does not run and/or the vehicle is parked and/or the generator does not supply any current. For this, it makes sense to arrange a release switch 16 parallel to the separator components, particularly to the heating element 15, which allows current to flow, for example, only in the opened state to the heating element 15. This measure ensures a high operational safety of the vehicle. According to the invention, it makes sense to additionally provide the tripping device with a connection 3 that permits the feeding in of different tripping signals for disconnecting the vehicle electrical system 14 from the battery 10. Thus, the device for protecting against polarity reversal can be combined with other safety devices, e.g. crash sensors or overcurrent sensors, which cause the connection between battery 10 and vehicle electrical system 14 to be disconnected if the respective malfunctions occur.

In the polarity reversal case, according to the invention, the negative electrical system voltage is initially limited by an element 1, which preferably can take up a high current. Thus, it is ensured that the negative voltage present in the vehicle electrical system 14 until the separator is tripped cannot reach a value that is critical to the remaining components in the vehicle electrical system 14. The limiter 1 preferably is a diode that can be activated only in case of high currents in a forward direction and which can carry high electrical currents, particularly currents of more than 100 Ampere, while in a state of high-conductivity. As a result, it is ensured that sporadically occurring, energy-poor negative pulses, e.g., Schaffner pulses of the type No. 1 or No. 3a, do not result in an undesirable activation of the separator in the vehicle electrical system. The limiter, particularly the diode, can predetermine the current level or the limiting voltage. A sufficiently high current flow through the limiter 1 is necessary to trip the separator, so that a possible polarity reversal can be detected with certainty.

The low voltage drop with polarity reversal, caused by the high current flow at the limiter 1, is detected by the electronic tripping device 2. The device turns on and thus generates a current flow in the element 15, which leads to the activation of the separator. In particular if the separator 17 is a pyrotechnical separator, the element 15 is the associated igniter. Tripping the bursting charge then separates the battery 10 from the vehicle electrical system 14.

Owing to the fact that the tripping device 2 responds only to a high current flow through the limiter 1, it is also ensured, particularly for the polarity reversal case during a motor vehicle jump-start, that the separator in particular opens the switch 17 only if the vehicle battery 10 is sufficiently weak and the external battery that is connected with polarity reversal can supply sufficient current to actually cause damages to the electrical system. If that is not the case, the negative voltage for the electrical system 14 will not reach a high enough level to require a shutdown.

Figure 2:
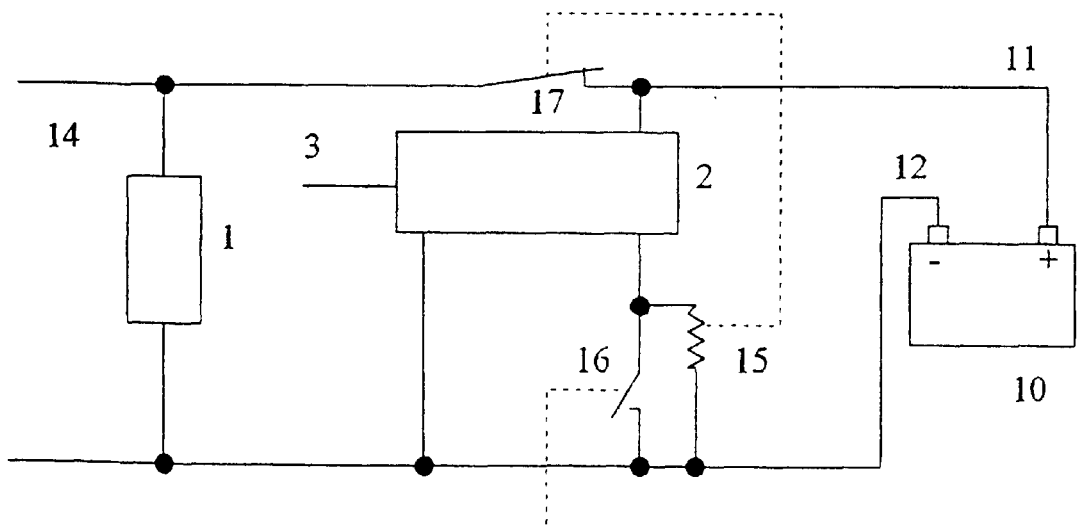
FIG. 2 is a basic wiring diagram of the circuit according to the invention, comprising a limiter, a trip and a separator.

If the voltage drop at the limiter 1 is not high enough, so that a sufficiently high tripping current for the tripping device 2 can flow, a voltage increase at the tripping device 2 can be generated by connecting the tripping device 2 on the battery side of the switch 17 of the separator. FIG. 2 illustrates this case. The advantage in this case is that the high current flowing over the limiter 1 causes a relatively high voltage drop via the separator, particularly the switch 17, as well as via the possibly existing connecting cable and the possibly existing transition resistances. This voltage drop can be used to activate the tripping device 2.

Neither the limiter 1 nor the circuit for tripping device 2 influences the vehicle electrical system 14 if there is no polarity reversal. It is particularly favorable that the limiter 1 and the tripping circuit 2 do not consume energy during normal operating conditions without polarity reversal.

Figure 3:
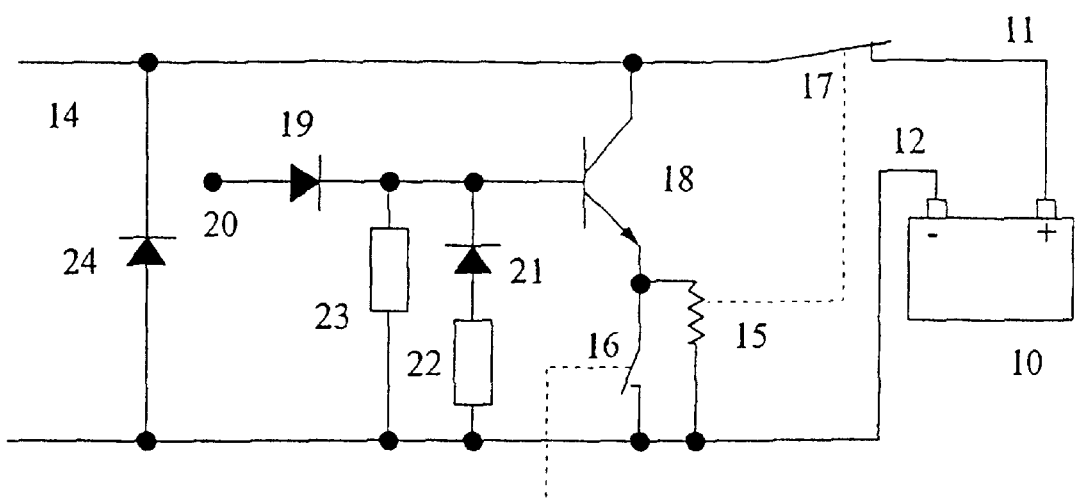
FIG. 3 is a schematic circuit diagram of a basic example of the circuit according to the invention.

FIG. 3 shows an exemplary embodiment of a protective circuit according to the invention for the polarity reversal case. A first diode 24, preferably a diode designed for high currents, is arranged parallel to the vehicle electrical system 14. The cathode for this first diode 24 is connected to the positive pole terminal 11 while the anode is connected to the negative pole terminal 12, in particular the ground potential for the circuit. A bipolar transistor 18, a second diode 21, a first low-impedance resistance 22, and a second low-impedance resistance 23 and a third diode 19 form the tripping device 2.

If the shutdown due to a polarity reversal is to occur only at a higher negative voltage, the first diode 24 can be replaced with two or more diodes that are connected in series. It makes sense to combine several diodes through a parallel connection and/or series-connection to form a limiter 1 and thus adjust its capacity for carrying current and the voltage-limiting value to the required voltage values and/or current values.

A series connection, consisting of a bipolar transistor 18 and an igniter 15 of the separator, is located parallel to the first diode 24. The collector for transistor 18 is connected to the positive pole terminal 11, the emitter of transistor 18 to the igniter 15. The base is connected to the cathode of a second diode 21, while the anode of this second diode is connected to the negative pole terminal 12. However, the anode can also be connected via a first resistance 22 to the pole terminal 12. A second resistance 23 is also located parallel to this second diode 21, which resistance is designed to prevent an undesirable activation of transistor 18.

If the limiter 1 is formed through a series connection and/or parallel connection of several diodes, it makes sense to adapt the second diode 21 as well to the voltage values and current values of the limiter 1 by using a series connection or a parallel connection of diodes.

A third diode 19, the cathode of which is connected to the base of transistor 18, makes it possible to couple in other tripping signals at the input 20 of tripping device 2, which input is connected to the anode of diode 19.

The collector-emitter voltage drop at transistor 18 preferably is smaller than the voltage drop over the first diode 24. In case of polarity reversal, the transistor 18 preferably is operated in the inverse mode in that the emitter is reverse biased since in that case the voltage drop over the collector-emitter path of the transistor is lowest. Thus, the igniter 15 can be supplied with a sufficiently high current, even if the negative voltage across the limiter 1 is low. It makes sense to suitably predetermine the voltage drop at the first diode 24.

If a negative voltage pulse is generated in the vehicle electrical system 14 during the opening of switch 17, the negative voltage in this circuit, which has the switch 17 arranged on the battery side of the limiter 1, would be limited by the limiter 1 to a value that does not damage the consumers hooked up to the vehicle electrical system 14.

What is claimed is:

1. A circuit for the protection of consumers in a vehicle electrical system (14) with a device for protecting against a polarity reversal, comprising a limiter (1) with a non-linear current/voltage characteristic, which is connected parallel to the vehicle electrical system (14) and limits the voltage of the vehicle electrical system to a predetermined value in case of an incorrect polarization; a tripping device (2) that activates at least indirectly a separator (17), which cuts the connection to the vehicle electrical system supply (10) if a tripping signal is generated in the tripping device (2); and wherein the tripping device (2) has an additional connection (3), which allows feeding different tripping signals from other safety devices into the tripping device for separating the vehicle electrical system (14) from the electrical system supply (10).

2. A circuit according to claim 1, wherein the other safety devices are crash sensors or overcurrent sensors.

3. A circuit according to claim 1, wherein the limiter (1) is formed by at least one diode designed for high currents.

4. A circuit according to claim 1, wherein the separator (17) is a bursting switch.

5. A circuit according to claim 1, wherein
the limiter (1) is formed by a first diode (24) that is parallel connected to the vehicle electrical system (14), wherein the cathode of the first diode (24) is connected to the positive pole terminal (11) and the anode to the negative pole terminal (120 of the vehicle electrical system (14), wherein a series of connection of a bipolar transistor (18) and an igniter (15) for tripping the separator (17) is arranged parallel to the limiter (1),
wherein the collector connection for the transistor (18) is connected to the positive pole terminal (11), the emitter connection of the transistor (18) to the igniter (15) and the base connection of the transistor (18) to the cathode of a second diode (21), wherein the anode connection of the second diode (21) is connected at least indirectly to the negative pole terminal (12) of the vehicle electrical system, and wherein a first resistance 23 is arranged parallel to the second diode (21).

6. A circuit according to claim 5, wherein the cathode of a third diode (19) is connected to the base of the transistor (18) and forms a signal input (20) together with the anode.

7. A circuit according to claim 5, wherein the second diode (21) is connected in series with a second resistance (22).

8. A circuit for the protection of consumers in a vehicle electrical system (14) with a device for protecting against a polarity reversal, comprising: a limiter (1), with a non-linear current/voltage characteristic, that is connected parallel to the vehicle electrical system (14) and limits the voltage of the vehicle electrical system to a predetermined value in case of an incorrect polarization: a tripping device (2) that detects a change to the incorrect polarity by monitoring at least one of the current and voltage at the limiter, and for generating a tripping signal upon detection of a polarity reversal; a separator, connected to the vehicle electrical system supply (10), and responsive to a tripping signal from said tripping device, for disconnecting the vehicle electrical system supply from the vehicle electrical system; and wherein the tripping device (2) has an additional connection (3), which permits feeding of signals from other safety devices into the tripping device for causing the tripping device to generate a tripping signal to cause disconnection of the vehicle electrical system (14) from the electrical system supply (10).

9. A circuit according to claim 8, wherein: the limiter (1) is formed by a first diode (24) that is parallel connected to the vehicle electrical system (14); the cathode of the first diode (24) is connected to the positive pole terminal (11) and the anode to the negative pole terminal (12) of the vehicle electrical system (14); a series connection of a bipolar transistor (18) and a control circuit (15), which is responsive to the tripping signal, for tripping the separator (17), is arranged parallel to the limiter (1); the collector connection for the transistor (18) is connected to the positive pole terminal (11); the emitter connection of the transistor (18) to the control circuit (15) and the base connection of the transistor (18) to the cathode of a second diode (21); the anode connection of the second diode (21) is connected at least indirectly to the negative pole terminal (12) of the vehicle electrical system; and a first resistance (23) is arranged parallel to the second diode (21).

10. A circuit according to claim 9 wherein the separator is a switch connected to the positive terminal and in series with the electrical system supply, and the collector of the transistor is connected to the positive terminal between the switch and the electrical system supply.

11. A circuit according to claim 9 wherein the separator is a switch connected to the positive terminal and in series with the electrical system supply, and the collector of the transistor is connected to the positive terminal of the supply via the switch.

* * * * *